(12) United States Patent
Sehon et al.

(10) Patent No.: US 12,204,561 B2
(45) Date of Patent: Jan. 21, 2025

(54) METHODS AND SYSTEMS FOR A STANDARDIZED DATA ASSET GENERATOR BASED ON ONTOLOGIES DETECTED IN KNOWLEDGE GRAPHS OF KEYWORDS FOR EXISTING DATA ASSETS

(71) Applicant: Capital One Services, LLC, McLean, VA (US)

(72) Inventors: Bethany Sehon, Oakton, VA (US); Christina Marie Egea, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 330 days.

(21) Appl. No.: 17/820,902

(22) Filed: Aug. 19, 2022

(65) Prior Publication Data
US 2024/0061866 A1 Feb. 22, 2024

(51) Int. Cl.
*G06F 16/28* (2019.01)
*G06F 16/242* (2019.01)
*G06F 16/2457* (2019.01)

(52) U.S. Cl.
CPC .......... *G06F 16/285* (2019.01); *G06F 16/243* (2019.01); *G06F 16/2457* (2019.01)

(58) Field of Classification Search
CPC ... G06F 16/2457; G06F 16/243; G06F 16/285
See application file for complete search history.

(56) References Cited

U.S. PATENT DOCUMENTS

| | | | |
|---|---|---|---|
| 10,467,290 B1* | 11/2019 | Wu | G06F 16/9024 |
| 10,977,311 B2* | 4/2021 | Sathish | G06F 16/90324 |
| 2019/0220524 A1* | 7/2019 | Costabello | G06F 16/24578 |
| 2021/0109952 A1* | 4/2021 | Meyerzon | G06F 16/355 |

(Continued)

OTHER PUBLICATIONS

M. Waszak, A. N. Lam, V. Hoffmann, B. Elvesæter, M. F. Mogos and D. Roman, "Let the Asset Decide: Digital Twins with Knowledge Graphs," 2022 IEEE 19th International Conference on Software Architecture Companion (ICSA-C), Honolulu, HI, USA, 2022, pp. 35-39. (Year: 2022).*

(Continued)

*Primary Examiner* — Kris E Mackes
(74) *Attorney, Agent, or Firm* — Foley & Lardner LLP

(57) ABSTRACT

Methods and systems create a data asset generator based on a knowledge-graph-based recommendation engine to present data asset type options to a user generating a data asset. The data asset type options are contained in a template. The user is required to use the templates generated by the system when creating a data asset. The templates are based on ontologies, which are based on a knowledge graph that stores the relationships between data asset types. Data asset types correlate to data asset characteristic clusters, which are clusters of keywords from previously generated data assets. The templates may help users select relevant data asset types and ensure regulatory compliance. By requiring a user to modify or adapt the template, data assets being generated may be standardized among previously generated data assets and data assets being generated, which may reduce querying conflicts and improve the readability and interoperability of datasets.

20 Claims, 5 Drawing Sheets

(56) References Cited

U.S. PATENT DOCUMENTS

| | | | |
|---|---|---|---|
| 2022/0019579 A1* | 1/2022 | Meyerzon | G06N 5/022 |
| 2022/0019740 A1* | 1/2022 | Meyerzon | G06F 40/295 |
| 2023/0162820 A1* | 5/2023 | Matei | G16H 30/40 |
| | | | 705/2 |
| 2024/0004514 A1* | 1/2024 | Sarin | G06T 11/206 |

OTHER PUBLICATIONS

N. Sahlab, S. Kamm, T. Müller, N. Jazdi and M. Weyrich, "Knowledge Graphs as Enhancers of Intelligent Digital Twins," 2021 4th IEEE International Conference on Industrial Cyber-Physical Systems (ICPS), Victoria, BC, Canada, 2021, pp. 19-24. (Year: 2021).*

* cited by examiner

METHODS AND SYSTEMS FOR A STANDARDIZED DATA ASSET GENERATOR BASED ON ONTOLOGIES DETECTED IN KNOWLEDGE GRAPHS OF KEYWORDS FOR EXISTING DATA ASSETS

BACKGROUND

As the world increasingly moves towards the use of electronic storage as the predominant storage method, the amount and type of data in storage continues to expand. Without standardization, data asset queries may not reach all relevant data assets. Some data assets containing relevant data may not be accessed due to a lack of standardization. It is imperative that new data assets are standardized to reduce querying conflicts and improve the readability and interoperability of various data assets.

SUMMARY

Methods and systems are described herein for novel uses and/or improvements to data asset generation. As one example, methods and systems are described herein for helping users discover data asset templates with consistent terms and standard definitions as well as proactively standardizing a new data asset to better integrate with preexisting data assets and data assets created in the future. For example, if a user is creating a new data asset to store customer transaction history, the system may present the user with a template comprising a group of data asset types from which to choose. The data asset type choices may include "customerID," "name," "purchaseDate," "returnStatus," and "price." The user may select the data asset types relevant to the new data asset. For example, the user may select "customerID," "name," "purchaseDate," and "price," but not "returnStatus" as returns may not be a relevant data asset type for the application. Once the user selects the necessary data asset types, the system correlates the new data asset with existing data assets by using the data asset types that may be uniform across data assets. By using data asset types instead of keywords with equivalent relationships, when another user generates a similar data asset, they may be presented with templates comprising similar data asset type options from which to choose.

Existing systems do not proactively standardize new data assets, opting to instead reactively standardize datasets, which poses compounding problems with accessing data assets from various non-standardized data sources. For example, as users contribute to a database of existing assets, users do not want to take the time to review how previous data assets were categorized or used. As systems expand and the number of existing assets increases, there is simply no conventional mechanism to determine how different assets are categorized or what those categories should be.

One solution to the lack of standardization across new and existing data assets is to use a model to aggregate and process keywords from preexisting data assets to form a knowledge graph. The knowledge graph may identify relationships between data asset types and associated data asset characteristic clusters. Subsections of the knowledge graph can be isolated in ontologies. The system may recommend templates comprising multiple ontologies for users generating new data assets to adapt or modify for specific use cases. By requiring the user to use a template comprising ontologies when generating new data assets, the system may help ensure standardization across new and existing data assets. Without standardization across data assets, queries need to be customized to match the specific data asset. Standardization allows one query to interact with each standardized data asset, which may yield a more accurate result in a more efficient manner. However, the difficulty in generating data asset templates for users includes several technical challenges including how to accurately cluster data asset characteristics and how to identify the relationships between data asset characteristic clusters and data asset types. The system may be difficult to implement because generating a knowledge graph requires an advanced model and access to a wide array of existing data assets.

To overcome these technical deficiencies, systems and methods are recited herein for generating templates for users who are generating new data assets wherein the templates are based on ontologies detected in knowledge graphs of data asset characteristic clusters of keywords from existing data assets. For example, the system may collate keywords from existing data assets to input into a model that will cluster keywords into data asset characteristic clusters and associate each of the data asset characteristic clusters with a data asset type. The relationships between the data asset types and the corresponding data asset characteristic clusters will be represented in a knowledge graph. The system may present a template including multiple ontologies comprising portions of the knowledge graph that are relevant to a user generating a new data asset. Accordingly, the methods and systems provide a way to proactively standardize data assets, which may reduce querying conflicts and improve the readability and interoperability of various data assets.

By generating templates for users to use when creating new data assets, the system may generate data asset type options for a user to select when creating new data assets. The data asset type options are based on relationships between data asset types identified and stored in the knowledge graph. The relationships between data asset types represented in the knowledge graph are determined by a model that considers existing data assets and may integrate natural language processing. The relevant relationships in the knowledge graph are isolated in an ontology that is determined based on existing data assets with similar features or functions. The template may comprise multiple relevant ontologies to provide the user with comprehensive data asset type options. The new data asset types will be selected for use in the template based on data asset characteristic clusters detected from keywords from existing data assets.

In some aspects, methods and systems are designed to create a data asset generator based on a knowledge-graph-based recommendation engine to present templates based on previous data assets containing useful attributes when creating a data asset. The method may detect a first data asset characteristic cluster, wherein the first data asset characteristic cluster is based on keywords from a first data asset. The method may detect a second data asset characteristic cluster, wherein the second data asset characteristic cluster is based on the keywords from the first data asset. The method may determine a first data asset type based on the first data asset characteristic cluster and determine a second data asset type based on the second data asset characteristic cluster. The method may generate a knowledge graph, wherein the knowledge graph comprises the first data asset type and the second data asset type, detect a first ontology, wherein the first ontology is based on a first subsection of the knowledge graph, and detect a second ontology, wherein the second ontology is based on a second subsection of the knowledge graph. The method may receive a first user action to generate a second data asset and determine a first template, wherein the first ontology and the second ontology are represented as the first template for a user. In response to determining the first template, the method may generate for display, in a user interface, a plurality of options indicating potential data asset types based on the first user action. The user is required to modify or adapt the template determined by the system. The options selected from the template are guaranteed to integrate with existing data assets. For example, this method ensures that data assets are proactively standardized, thereby reducing querying conflicts and improving the readability and interoperability of various data assets. Accordingly, the methods and systems provide a method for generating data assets that are proactively standardized and easier for users to create than existing methods.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details, or with an equivalent arrangement. In other cases, well-known structures and devices are shown in block diagram form in order to avoid unnecessarily obscuring the embodiments of the invention.

Figure 1:
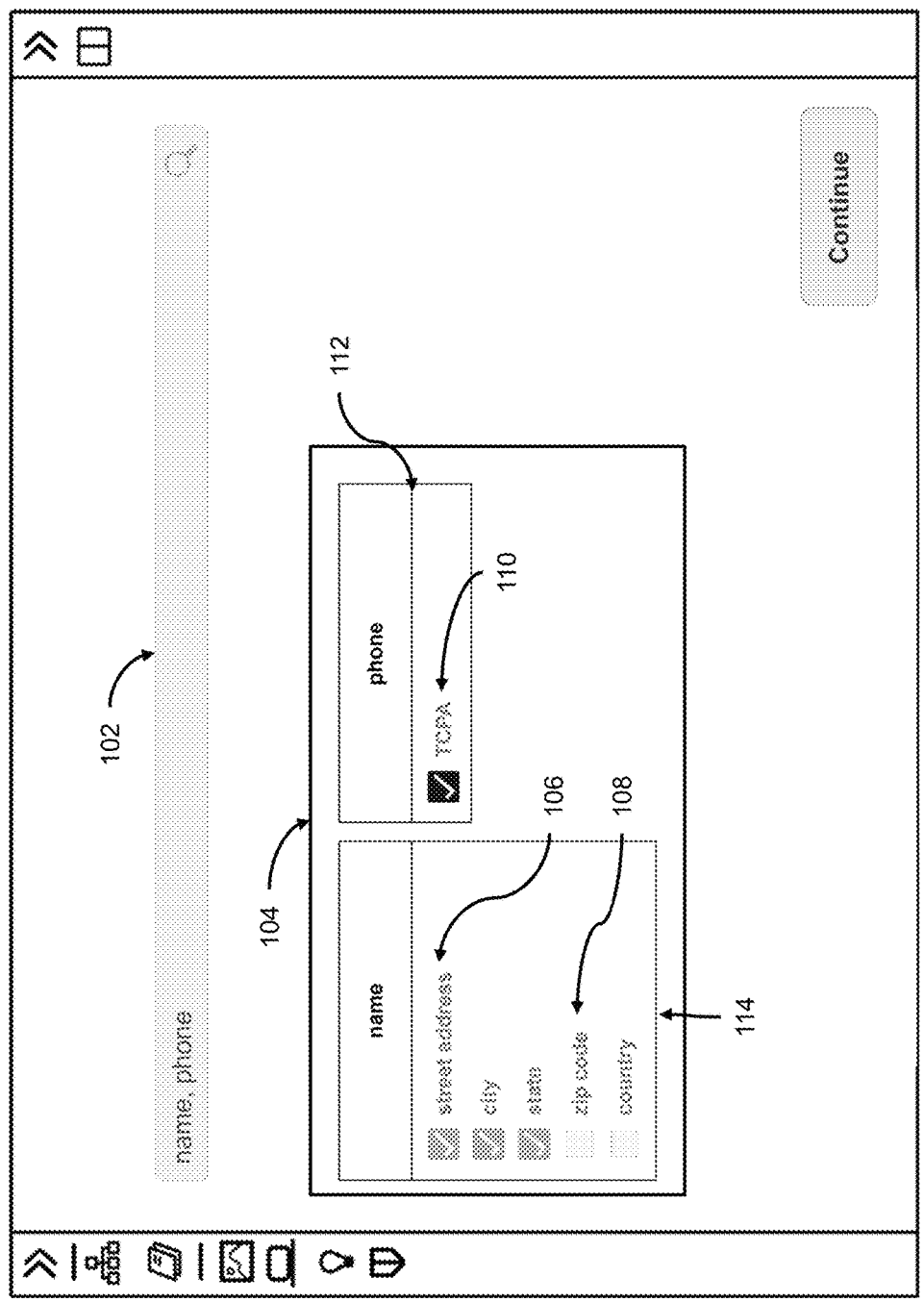
FIG. 1 shows an illustrative user interface in response to a user action that displays a plurality of options indicating potential data asset types, in accordance with one or more embodiments.

FIG. 1 shows an illustrative user interface 100 in response to a user action that displays a plurality of options indicating potential data asset types, in accordance with one or more embodiments. For example, the system generates user interface 100 in response to a user action to generate a new data asset, which may include a user entering desired data asset types in a text input field 102. The user may then be presented with a template of data asset types 104 that contains options from the ontology from the knowledge graph. The template may include data asset types that are optional, and the user may select the optional data asset type 106 or choose not to select the optional data asset type 108. In some instances, such as when complying with regulatory policies, the data asset type is required and is automatically selected 110.

For example, FIG. 1 illustrates the template 104 of ontologies 112 and 114 that a user may be required to select or modify when generating a new data asset. In conventional systems, users may not be presented with templates and may not have the ability to standardize new data assets with existing data assets. For example, the templates presented to users may be based on ontologies that are a subsection of the knowledge graph generated by clustering keywords from existing data assets. For example, a subsection may include a portion of the knowledge graph that is relevant for use in generating templates for the user to adapt or modify. Furthermore, a subsection may include relevant data asset types for use in generating new data assets.

By generating ontologies and presenting templates to the user, the system may help ensure standardization across existing and new data assets so that querying databases is easier. Existing data assets may include data assets generated in the past. For example, existing data assets may be a subsection of a relational database. In contrast, new data assets may be data assets that are data assets in the process of being created. For example, once it is possible to store data the data asset can be considered existing. For example, when a user is finished generating a data asset, the data asset exists. Conventionally, users may be required to attempt to standardize new databases, but often this is challenging as there can be an overwhelming number of existing data assets each with potentially non-standardized keywords. By using a model to cluster keywords into data asset characteristic clusters and define the connections between the data asset characteristic clusters in a knowledge graph, the system may present users with data asset types that are relevant for the new data asset the user is generating. As such, the system may help users query databases using consistent terms and standard definitions. Furthermore, the system may help users creating new data assets to easily comply with standardization procedures to help ensure uniformity in naming convention across data assets.

As referred to herein, a "user interface" may comprise a human-computer interaction and communication in a device, and may include display screens, keyboards, a mouse, and the appearance of a desktop. For example, a user interface may comprise a way a user interacts with an application or a website.

The system may use a data asset. As referred to herein a "data asset" may comprise content (e.g., as found in a relational database or a subsection of a relational database). In some embodiments, the data asset may comprise an entire existing relational database. In some embodiments, the data asset may comprise a portion of an existing relational database. As referred to herein, "content" should be understood to mean an electronically consumable user asset, such as stored computer data, Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

In some embodiments, the system may determine the data asset by referencing an entire existing relational database. For example, by referencing an entire existing relational database, the system may ensure that attributes contained in the relational database are considered by the system. Additionally, or alternatively, the system may determine the data asset by referencing a portion of an existing relational database. For example, by referencing a portion of an existing relational database, the system may ensure that only relevant attributes contained in the portion of the relational database are considered by the system.

The system may use keywords. As referred to herein a "keyword" may comprise a term referring to an attribute in content (e.g., a key in a relational database). In some embodiments, a keyword may comprise an attribute in a relational database. In some embodiments, a keyword may comprise a key in a relational database. As referred to herein, an "attribute" means an entity that represents discrete content, such as a column header, data label, or table name. For example, the keyword may refer to an attribute in an existing data asset called "DOB," which identifies a date of birth. As referred to herein a "data asset characteristic" may comprise a term referring to a keyword once it is associated with a data type.

In some embodiments, the system may determine the keyword by identifying attributes that are used in more than one existing relational database but are identical. For example, by determining a single keyword for attributes that are identical across existing databases, the system may reduce redundancy in determining keywords. Additionally, or alternatively, the system may determine multiple keywords that have an equivalent relationship across existing databases. For example, by determining multiple keywords with equivalent relationships, the system may incorporate many existing databases into the standardization process.

The system may use a data asset characteristic cluster. As referred to herein, a "data asset characteristic cluster" may comprise the output of a model (e.g., aggregated keywords with equivalent relationships). For example, a data asset characteristic cluster representing "first name" may include keywords that share an equivalent relationship such as "fname," "first_name," or "firstName." For example, a data asset characteristic cluster representing "phone number" may include keywords that share an equivalent relationship such as "pnum," "phone_number," or "phoneNumber."

In some embodiments, the system may determine data asset characteristic clusters by using a model to aggregate keywords with equivalent relationships. For example, by determining keywords derived from existing data assets that have equivalent relationships, the system may easily refer to one data asset type comprising all keywords with equivalent relationships, which makes it easier for the system to reference a specific group of keywords with equivalent relationships.

The system may use data asset types. As referred to herein, a "data asset type" may comprise a set of keywords with equivalent relationships (e.g., a data asset characteristic cluster). For example, a data asset type may be "accountID," which comprises a data asset characteristic cluster comprising keywords that share an equivalent relationship in existing data assets such as "account" or "account_id." In some embodiments, the data asset type may comprise a misspelled variation of an attribute.

In some embodiments, the system may determine a data asset type by associating relevant data asset characteristic clusters with the data asset type. For example, by determining keywords with an equivalent relationship and using a model to cluster them into a data asset type, the system may be able to reference the same group of keywords with equivalent terms by referring only to the data asset type.

The system may use a knowledge graph. As referred to herein, a "knowledge graph" may include a digital representation of the relationship between different entities (e.g., relationship between different data asset types). For example, the knowledge graph may comprise a relationship between a data asset type "first name" and a data asset type "last name."

In some embodiments, the system may determine a knowledge graph by inputting data asset characteristic clusters into a model that assesses the relationships between data asset characteristic clusters. For example, by determining the relationships between data asset characteristic clusters, the system may store the relationship between keywords for existing data assets to help identify relevant information when generating new data assets.

The system may use a model. As referred to herein, a "model" may include one or more steps that may include machine learning algorithms. For example, a model may include three steps: 1) clustering keywords into data asset characteristic clusters, 2) representing the relationships between data asset characteristic clusters as part of a knowledge graph and 3) identifying relevant ontologies based on the user action. In some embodiments, the model may comprise a natural language processing algorithm. In some embodiments, the model may comprise a clustering algorithm. In some embodiments, the model may comprise a machine learning model powering a recommendation engine.

In some embodiments, the system may determine the model by clustering keywords, identifying relationships between clusters with a knowledge graph, and identifying ontologies in the knowledge graph relevant to a user. For example, by determining keyword clusters, the knowledge graph, and relevant ontologies, the system may easily identify attributes common across relational databases for use in a system agnostic data asset generator.

The system may use an ontology. As referred to herein, an "ontology" may comprise relationships (e.g., relationships in a knowledge graph). In some embodiments, the ontology may comprise a section of the knowledge graph in response to a user action. As referred to herein, "relationships" should be understood to mean a relationship between two or more digital entities. Relationships may include relationships between two entities in a single direction: the first entity is related to a second entity, or relationships between two entities in both directions: the first entity is related to the second entity and the second entity is related to the first entity. For example, relationship may include a standardized representation of the relationships between data asset characteristic clusters within a knowledge graph. For example, if many existing data assets that have a "first name" data asset type also have a "last name" data asset type, both data asset types may form an ontology. In some embodiments, the ontology may comprise a combination of data asset types that is required to ensure regulatory compliance in response to a user action. For example, if a user is generating a data asset for automated marketing calls and includes the data asset type "phone number," the data asset type "TCPA" may also be added to ensure compliance with the Telephone Consumer Protection Act. For example, the "phone number"

data asset type and the "TCPA" data asset type together form the ontology presented to the user as part of a template.

In some embodiments, the system may determine the ontology by identifying data asset types that are typically together in data assets. For example, by determining data asset types that are typically both contained in a data asset, the system may ensure proactive standardization across data assets. Additionally, or alternatively, the system may determine an ontology by grouping data asset types together to ensure regulatory compliance in a data asset. For example, by determining data asset types that must remain together to ensure regulatory compliance, the system may help ensure that regulatory compliance is passive for the user.

The system may use a template. As referred to herein, a "template" may include various ontologies. Ontologies may be derived from a knowledge graph. For example, if a user is generating a customer data asset, the template presented to the user may comprise a "phone" ontology comprising a "phone number" data asset type as well as a "phone type" data asset type as well as a "customer identification" ontology comprising a "first name" data asset type, a "last name" data asset type, and a "customer ID" data asset type.

In some embodiments, the system may determine a template by analyzing existing data assets to determine which ontologies should be presented to the user. For example, by determining a template based on existing data assets, the system may help ensure proactive standardization and integration of new data assets with existing data assets.

Figure 2:
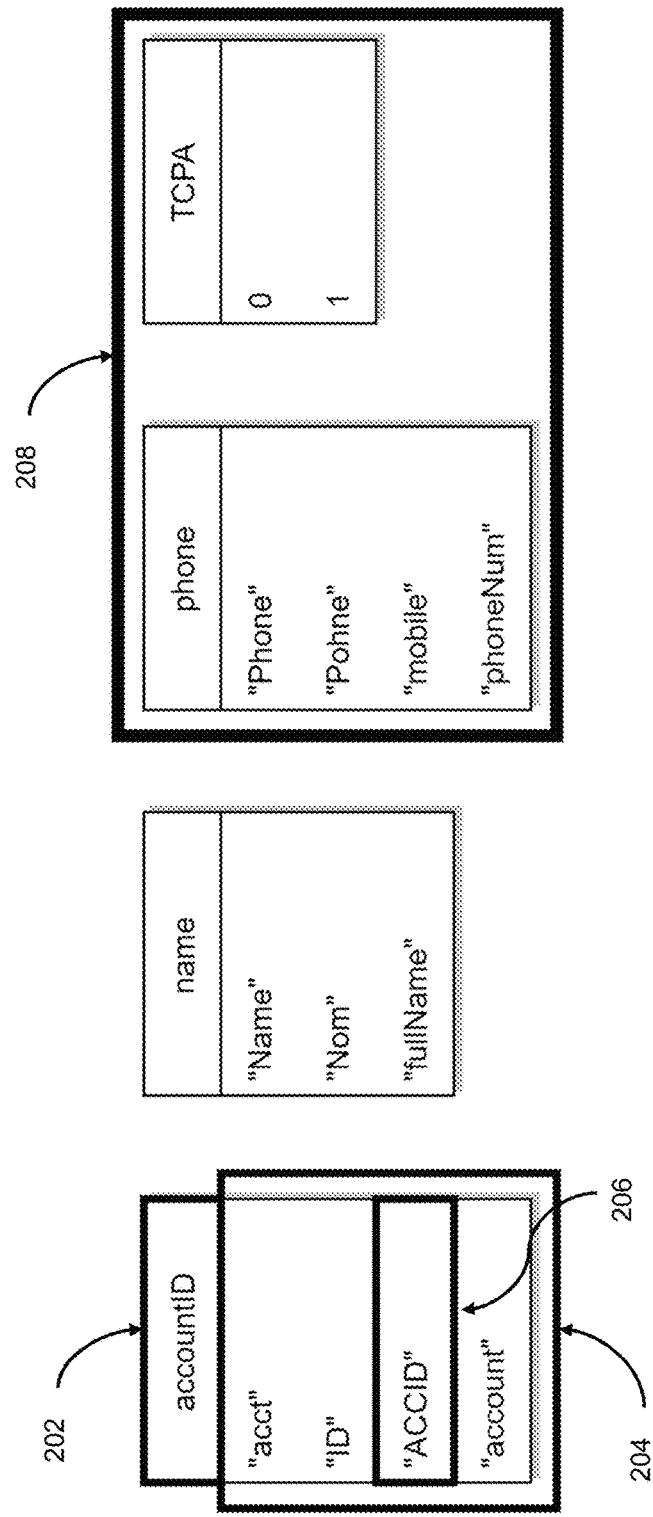
FIG. 2 shows the components necessary to create an ontology, in accordance with one or more embodiments.

FIG. 2 shows an illustrative diagram 200 including data asset characteristics 206, data asset characteristic clusters 204, data asset types 202, and an ontology 208 illustrating the components necessary to determine ontologies, in accordance with one or more embodiments. The model inputs solve the technical challenge of aggregating information from existing data assets to inform the generation of new data assets. For example, the system may aggregate keywords from existing data assets and use a model to provide recommendations for a user generating a new data asset.

For example, the system may identify a data asset characteristic from an existing data asset. The system may identify similar data asset characteristics and clusters them in a data asset characteristic cluster. Once similar data asset characteristic clusters are generated, the system may assign a data asset type to the cluster. The data asset type may be used by the system or the user to query existing and new relational databases with attributes that have equivalent relationships. By doing so, the system may generate new data assets that can be easily incorporated with existing data assets so users can make queries regardless of the specific data asset characteristic by simply referring to the data asset type. Finally, data asset types that share a relationship in a knowledge graph and that are relevant to the creation of a new data asset may be grouped in an ontology for later use in a template presented to the user. By doing so, the system alleviates the need for the user to keep track of the various data asset types that may be relevant when generating a new data asset.

Figure 3:
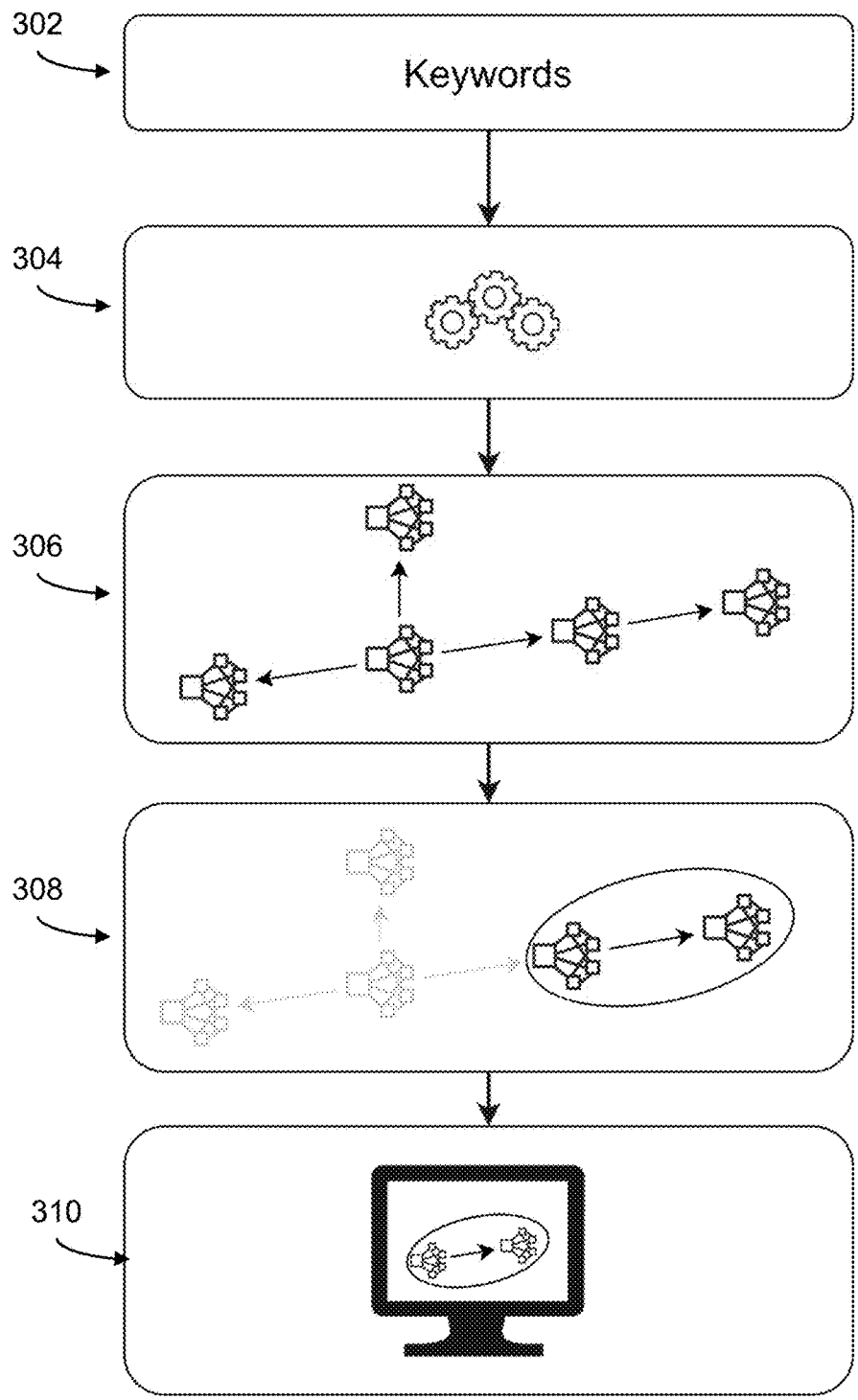
FIG. 3 shows an illustrative flowchart of the steps involved in generating a new data asset with the data asset generator, in accordance with one or more embodiments.

FIG. 3 shows an illustrative flowchart 300 of the steps involved in generating a new data asset with the data asset generator used to present templates when a user is generating new data assets, in accordance with one or more embodiments. For example, FIG. 3 may show illustrative components for ensuring new data assets are correlated with existing data assets. Ensuring the correlation between new data assets and existing data assets will help ensure that users can query data assets by using the same data asset type, which may reduce querying conflicts and improve the readability and interoperability of new and existing data assets.

At step 302, process 300 identifies keywords from existing data assets by assessing each attribute and compiling a group of keywords. For example, the system may add keywords "first name," "last name," "email address" from a first data asset and keywords "firstName," "lastName" and "emailAddress" from a second data asset to a group of keywords. By doing so, the system may consider all keywords from various existing data assets to help standardize existing data assets.

At step 304, process 300 inputs the keywords grouped in step 302 into a clustering model. For example, the system may cluster keywords "first name" and "firstName," "last name" and "lastName," and "email address" and "emailAddress" into data asset characteristic clusters. By doing so, the system logically groups keywords that share an equivalent relationship.

At step 306, process 300 uses the data asset characteristic clusters to represent the relationships between data asset types in a knowledge graph. For example, there may be a relationship between "customer" and "first name" and "last name." By identifying this relationship, the system may provide accurate data asset type recommendations based on relationships between the recommended data asset types and the data asset types the user entered when generating a new data asset.

At step 308, process 300 forms ontologies from the knowledge graph. For example, if a there is a relationship between "customer" and "first name" and "last name" the system may create an ontology called "customer." By doing so, the system may use an ontology with associated data asset types to help a user generate a new data asset.

At step 310, process 300 presents a template comprising relevant ontologies for display on a user interface for a user creating a new data asset. For example, a user creating a customer database may be presented with a "customer profile" ontology and a "contact information" ontology. By doing so, new data assets that are generated are automatically standardized with existing data, which may reduce querying conflicts and improve the readability and interoperability of new and existing data assets.

Figure 4:
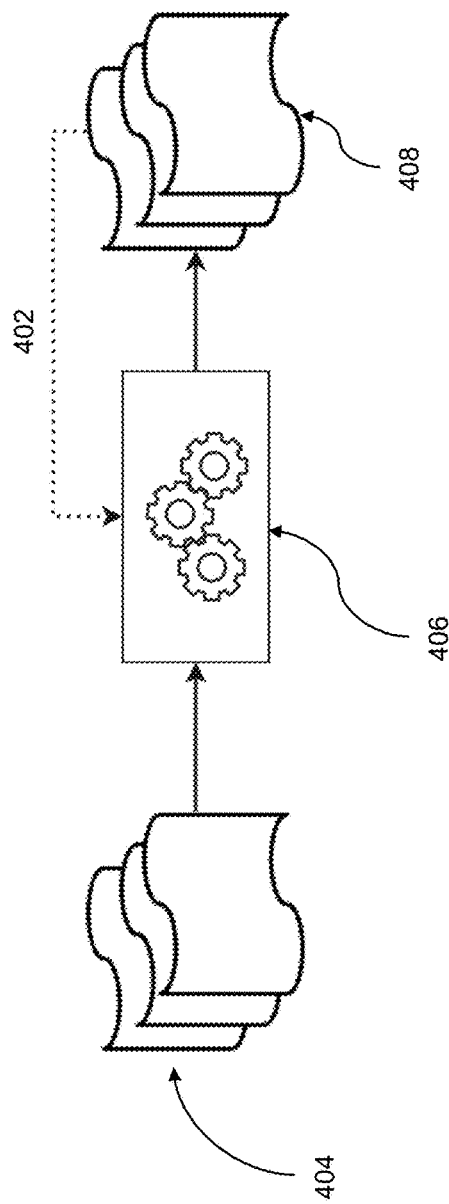
FIG. 4 shows the model used in the data asset generator, in accordance with one or more embodiments.

FIG. 4 shows a diagram of model 400 used in the data asset generator, in accordance with one or more embodiments. In some embodiments, model 400 may include input 404, model 406, and output 408. In some embodiments, output 408 can be reused as input in 402. Input 404 may include keywords from various existing data assets. Model 406 may cluster keywords and develop a knowledge graph including the relationships between the data asset characteristic clusters. Output 408 may include a knowledge graph, ontologies, and templates to present to a user. By doing so, the system may generate relevant templates for users generating new data assets. Using templates helps to ensure that new data assets and existing data assets are standardized, which may reduce querying conflicts and improve the readability and interoperability of new and existing data assets.

Model 406 may take inputs 404 and provide outputs 408. The inputs may include multiple datasets, such as a training dataset and a test dataset. Each of the plurality of datasets (e.g., inputs 404) may include data subsets related to user data, predicted forecasts and/or errors, and/or actual forecasts and/or errors. In some embodiments, outputs 408 may be fed back to model 406 as input to train model 406 (e.g., alone or in conjunction with user indications of the accuracy of outputs 408, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., "email," "name," and "phone number").

In a variety of embodiments, model 406 may update its configurations (e.g., weights, biases, or other parameters) based on the assessment of its prediction (e.g., outputs 408) and reference feedback information (e.g., user indication of accuracy, reference labels, or other information). In a variety of embodiments, where model 406 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 406 may be trained to generate better predictions.

In some embodiments, model 406 may include an artificial neural network. In such embodiments, model 406 may include an input layer and one or more hidden layers. Each neural unit of model 406 may be connected with many other neural units of model 406. Such connections may be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 406 may be self-learning and trained, rather than explicitly programmed, and can perform significantly better in certain areas of problem solving, as compared to traditional computer programs. During training, an output layer of model 406 may correspond to a classification of model 406, and an input known to correspond to that classification may be input into an input layer of model 406 during training. During testing, an input without a known classification may be input into the input layer, and a determined classification may be output.

In some embodiments, model 406 may include multiple layers (e.g., where a signal path traverses from front layers to back layers). In some embodiments, back propagation techniques may be utilized by model 406 where forward stimulation is used to reset weights on the "front" neural units. In some embodiments, stimulation and inhibition for model 406 may be more free-flowing, with connections interacting in a more chaotic and complex fashion. During testing, an output layer of model 406 may indicate whether or not a given input corresponds to a classification of model 406 (e.g., "financial data," "product information," or "employee data").

In some embodiments, the model (e.g., model 406) may automatically perform actions based on outputs 408. In some embodiments, the model (e.g., model 406) may not perform any actions. The output of the model (e.g., model 406) may be used to determine relevant ontologies based on the user action. Furthermore, the ontologies determined by the model (e.g., model 406) may be included in a template presented to a user wherein the user may select data types for a new data asset type.

Figure 5:
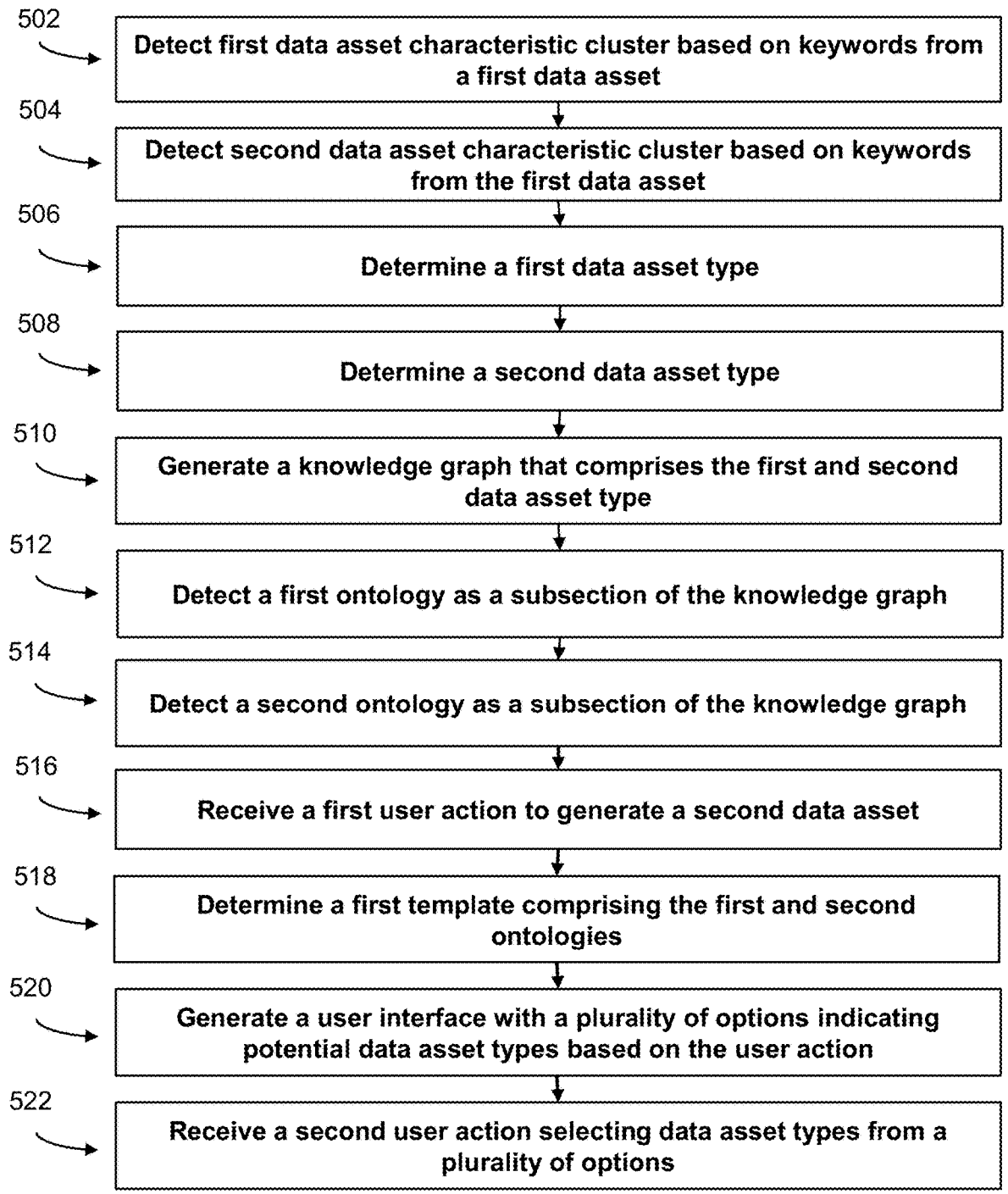
FIG. 5 shows a flowchart of the steps involved in generating a new data asset with the data asset generator, in accordance with one or more embodiments.

FIG. 5 shows a flowchart of the steps involved in generating templates indicating potential data asset types when a user is generating a new data asset, in accordance with one or more embodiments. For example, the system may use process 500 (e.g., as implemented on one or more system components described above) in order to aid users generating a new data asset to standardize the new data asset as well as existing data assets, which makes querying new and existing databases more efficient and more accurate.

At step 502, process 500 (e.g., using one or more components described above) detects the first data asset characteristic cluster based on keywords from existing databases. For example, the system may detect a first data asset characteristic cluster, wherein the first data asset characteristic cluster is based on keywords from existing databases. The system may cluster keywords with equivalent relationships, for example, the system may cluster keywords that refer to a username. By doing so, the system may reference multiple non-standardized existing data assets by using one data asset type, which may reduce querying conflicts and improve the readability and interoperability of new and existing data assets.

At step 504, process 500 (e.g., using one or more components described above) detects a second data asset characteristic cluster based on keywords from existing databases. For example, the system may detect a second data asset characteristic cluster, wherein the second data asset characteristic cluster is based on the keywords from the existing databases. The system may cluster keywords with equivalent relationships, for example, the system may cluster keywords that refer to a phone number. By doing so, the system may reference multiple non-standardized existing data assets by using one data asset type, which may reduce querying conflicts and improve the readability and interoperability of new and existing data assets.

In some embodiments, the system may determine a keyword from an existing data asset and assign the keyword as a first data asset characteristic of a data asset type. For example, the system may determine a first keyword from a plurality of attributes contained in existing data assets and assign the first keyword as a first data asset characteristic of the first data asset type. For example, the system may determine keywords "first name" and "last name" from an existing data asset comprising information related to specific people, cluster these keywords with keywords from other existing data assets and assign a data asset type "name" to the data asset characteristics. By doing so, the system may establish data asset types to refer to groups of keywords with equivalent relationships.

In some embodiments, the system may categorize keywords into data asset characteristic clusters and represent the relationships between clusters with a knowledge graph. For example, the system may retrieve a first dataset comprising first keywords for a first set of data assets with unknown data asset types, cluster a portion of the first keywords into the first data asset characteristic cluster and input the first data asset characteristic cluster into a model to determine the knowledge graph. The system may represent relationships between the data asset characteristic cluster representing a username and a data asset characteristic cluster representing hashed passwords in a knowledge graph. By doing so, the system may identify data asset characteristic clusters with relationships that will help inform a user generating new data assets.

In some embodiments, the system may semantically index tagged content based on concept matching, statistical patterns, or linguistic analysis. For example, the system may semantically index manually tagged content and automatically tagged content, wherein the automatically tagged content is based on concept matching, statistical patterns, or linguistic analysis. For example, the system may assign tags to keywords or data asset types for readability by machines and humans. By doing so, the system may integrate with existing processes and operations that require human or machine interaction. Furthermore, by indexing tagged content existing users may experience reduced querying conflicts and improved readability and interoperability of new and existing data assets.

In some embodiments, the system may detect ontologies for data asset types such as classes, subclasses, and relationships. For example, the system may detect ontologies for data asset types including classes, subclasses, relationship types and categories. Furthermore, the system may conduct semantic enrichment using natural language processing to determine relevant nodes, edges, and labels in the knowledge graph and conduct semantic tagging, wherein the semantic tagging adds semantic metadata to existing data asset characteristics for the first data asset characteristic cluster and the second data asset characteristic cluster. For example, the system may create an ontology that includes the relationship between a first data asset type "name" and a second data asset type "email." The system may tag the ontology to recall the ontology when generating new data assets. By doing so, the system may recommend the same ontology to users who are generating similar data assets. This will improve standardization across existing and new data assets, which may reduce querying conflicts and improve the readability and interoperability of new and existing data assets.

In some embodiments, the system may use k-means clustering to group keywords with equivalent relationships. For example, the system may cluster the portion of the first keywords into the first data asset characteristic cluster using a k-means clustering model to cluster data asset characteristics with equivalent relationships in the first data asset characteristic cluster. For example, the system may leverage a k-means clustering model to determine groups of keywords such as keywords that refer to a user's email. By doing so, the system may not have to reference each keyword that shares an equivalent relationship. Instead, the system can refer to the cluster that contains each relevant keyword. Referring to the data asset characteristic cluster may reduce the processing requirement of the system as individual keywords with equivalent relationships do not need to be referred to specifically.

In some embodiments, the system may determine multiple clusters from the keywords from existing data assets. For example, the system may determine a plurality of clusters in the first keywords. The system may select the first respective centroids for each of the plurality of clusters, group first respective data asset characteristics in the first keywords based on a first proximity to the first respective centroids and determine the second respective centroids for each of the plurality of clusters. Furthermore, the system may regroup the first respective data asset characteristics in the first keywords based on a second proximity to the second respective centroids and determine a difference in positions of the first respective centroids and the second respective centroids until the difference in position is zero. For example, the system may cluster keywords that relate to usernames or hashed passwords. By doing so, the system may reference the data asset type instead of each keyword with an equivalent relationship. This may reduce the processing requirements of the system and help improve the efficiency and accuracy of the system.

At step 506, process 500 (e.g., using one or more components described above) determines a first data asset type. For example, the system may determine a first data asset type based on the first data asset characteristic cluster. For example, the system may determine a data asset type called "address" that refers to the data asset characteristic comprising the data asset characteristics that have an equivalent relationship with an address. By doing so, the system may reference a cluster of data asset characteristics that have an equivalent relationship, thereby reducing querying conflicts and improving the readability and interoperability of new and existing data assets.

At step 508, process 500 (e.g., using one or more components described above) determines a second data asset type. For example, the system may determine a second data asset type based on the second data asset characteristic cluster. For example, the system may determine a data asset type called "name" that refers to the data asset characteristic comprising the data asset characteristics that have an equivalent relationship with a name. By doing so, the system may reference a cluster of data asset characteristics that have an equivalent relationship which may reduce querying conflicts and improve the readability and interoperability of new and existing data assets.

In some embodiments, the system may use natural language processing for determining a data asset type based on a data asset characteristic cluster. For example, the system may conduct natural language processing such as lemmatization or stemming to determine a common data asset characteristic that may be used as the data asset type to refer to a data asset characteristic cluster. For example, for a data asset characteristic cluster containing data asset characteristics that have equivalent relationships, a natural language processing model may determine one stem or lemma that occurs frequently and assign the frequently occurring stem or lemma as a data asset type to the data asset characteristic cluster. By doing so, the system may not have to reference each data asset characteristic. The system can instead reference the data asset type determined through natural language processing. Referring to the data asset characteristic cluster with a data asset type may reduce querying conflicts and improve the readability and interoperability of new and existing data assets.

In some embodiments, the system may include a data asset type schema comprising metadata for the data asset type. For example, the system may include a data asset type schema that comprises metadata categories for the first data asset type. For example, the system may add metadata for data asset type "name" noting that the data asset type is a string. By doing so, the system may present more accurate templates to users generating a new data asset type. Specifically, the templates include data asset types with metadata ensuring that only a specific data format is stored, which further improves standardization across new and existing data assets.

At step 510, process 500 (e.g., using one or more components described above) generates a knowledge graph that comprises the first and second data asset type. For example, the system may generate a knowledge graph, wherein the knowledge graph comprises the first data asset type and the second data asset type. For example, the first data asset type may be a name and the second data asset type may be a phone number. The knowledge graph the system generates may indicate determined relationships between data asset types. By doing so, the system may recommend a comprehensive representation of data asset types and their relationship with other data asset types from existing data assets. This may aid the user in standardizing new data assets.

At step 512, process 500 (e.g., using one or more components described above) detects a first ontology as a subsection of the knowledge graph. For example, the system may detect a first ontology, wherein the first ontology is based on a first subsection of the knowledge graph. For example, the system may identify a subsection of the knowledge graph that shows customer data may include certain data asset types such as "name," "email," or "phone number." By doing so, the system may create a customer data ontology comprising the relevant section of the knowledge graph for use in a template presented to the user to aid in standardizing new data assets.

At step 514, process 500 (e.g., using one or more components described above) detects a second ontology as a subsection of the knowledge graph. For example, the system may detect a second ontology, wherein the second ontology is based on a second subsection of the knowledge graph. For example, the system may identify a subsection of the knowledge graph that shows transaction history, which may include certain data asset types such as "customer id," "purchase date," or "return status." By doing so, the system may create a transaction history ontology comprising the relevant section of the knowledge graph for use in a template presented to the user to aid in standardizing new data assets.

At step 516, process 500 (e.g., using one or more components described above) receives a first user action to generate a new data asset. For example, the system may receive a first user action to generate a new data asset. For example, a user may enter a data asset type "name" to include in a new data asset. The system may use the entered data asset types as seed values to determine relevant ontologies and create a template to present to the user. By doing so, the system may ensure that new data assets are standardized with existing data assets, which may reduce querying conflicts and improve the readability and interoperability of new and existing data assets.

At step 518, process 500 (e.g., using one or more components described above) determines a first template comprising the first and second ontologies. For example, the system may determine a first template, wherein the first ontology and the second ontology are represented as the first template for a user. For example, if the user is generating a data asset to track purchases and repeated clients a template may be presented that includes a "customer data" ontology and a "transaction history" ontology from which the user generating the new data asset can select relevant data asset types to include. By doing so, the system may allow users to generate new data assets that are standardized with existing data assets by requiring users to use templates comprising data asset types in accordance with existing data assets.

At step 520, process 500 (e.g., using one or more components described above) generates a user interface with a plurality of options indicating potential data asset types based on the user action. For example, the system may generate for display, in a user interface, a plurality of options indicating potential data asset types based on the first user action. For example, a user generating a "contact list" data asset may be presented with data asset type options including "first name," "last name," "email," or "phone number." By doing so, the system may help ensure a user generating a new data asset does not need to compile data asset types or keywords from existing data assets manually and does not need to intentionally ensure regulatory compliance.

At step 522, process 500 (e.g., using one or more components described above) receives a second user action wherein a user may select data asset types from a plurality of options. For example, the system may receive a second user action selecting one or more data asset types based on the plurality of options. For example, if a user is generating a new data asset for transaction history, the user may be presented with optional data asset types including "product id," "price," and "quantity." By doing so, the system may allow users to generate new data assets that are standardized with existing data assets by providing users with a variety of relevant data asset types to select.

In some embodiments, the system may retrieve a template for creating a new data asset and select data asset types based on the first template. For example, the system may retrieve a first template for creating the new data asset based on the first ontology derived from the knowledge graph and select data asset types from the plurality of options based on the first template. For example, the system may present the user with a template comprising an ontology for "purchase history," which may comprise data asset types "price," "date," and "quantity." The user may then select the data asset types that are relevant for the new data asset the user is generating. By doing so, the system may help the user ensure data asset types are relevant and standardized across existing and new data assets. Furthermore, by requiring certain data asset types, the system may help ensure regulatory compliance.

In some embodiments, the system may filter various templates based on the user action to identify a template corresponding to the user action and determine data asset types based on the template displayed as options. For example, the system may filter a plurality of available templates based on the first user action to identify the first template as corresponding to the first user action and determine a plurality of data asset types based on the first template to display as the plurality of options. For example, the system may present a template comprising data asset types related to customer data if the user is generating a new data asset to store purchase history. By doing so, the system may help ensure the new data asset is standardized across existing and new data assets, as well as help ensure regulatory compliance.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above may be used to perform one or more of the steps in FIG. 5.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: detecting a first data asset characteristic cluster, wherein the first data asset characteristic cluster is based on a first data asset; detecting a second data asset characteristic cluster, wherein the second data asset characteristic cluster is based on a second data asset; determining a first data asset type based on the first data asset characteristic cluster; determining a second data asset type based on the second data asset characteristic cluster; generating a knowledge graph, wherein the knowledge graph comprises the first data asset type and the second data asset type; detecting a first ontology, wherein the first ontology is based on a first subsection of the knowledge graph; detecting a second ontology, wherein the second ontology is based on a second subsection of the knowledge graph; receiving a first user action to generate a second data asset; determining a first template for a user; in response to determining the first template, generating for display, in a user interface, a plurality of options indicating potential data asset types based on the first user action; and receiving a second user action selecting one or more data asset types based on the plurality of options.
2. The method of the preceding embodiment creates a data asset generator based on a knowledge-graph-based recommendation engine to present templates based on previous data assets containing useful attributes when creating a data asset.
3. The method of any one of the preceding embodiments, further comprising: determining a first keyword from a plurality of attributes contained in the first data asset; and assigning the first keyword as a first data asset characteristic of the first data asset type.
4. The method of any one of the preceding embodiments, wherein detecting the first data asset characteristic cluster for the first data asset type further comprises: retrieving a first dataset comprising first keywords for a first set of data assets with unknown data asset types; clustering a portion of the first keywords into the first data asset characteristic cluster; and inputting the first data asset characteristic cluster into a model to determine the knowledge graph.
5. The method of any one of the preceding embodiments, wherein the model is trained by: semantically indexing manually tagged content; and automatically tagged content, wherein the automatically tagged content is based on concept matching, statistical patterns, or linguistic analysis.
6. The method of any one of the preceding embodiments, wherein the model is trained to: detect ontologies for data asset types including classes, subclasses, relationship types and categories; conduct semantic enrichment using natural language processing to determine relevant nodes, edges, and labels in the knowledge graph; and conduct semantic tagging, wherein the semantic tagging adds semantic metadata to previously generated data asset characteristics for the first data asset characteristic cluster and the second data asset characteristic cluster.
7. The method of any one of the preceding embodiments, wherein clustering the portion of the first keywords into the first data asset characteristic cluster further comprises using a k-means clustering model to cluster data asset characteristics with equivalent relationships in the first data asset characteristic cluster.
8. The method of any one of the preceding embodiments, wherein using the k-means clustering model to cluster data asset characteristics with equivalent relationships in the first keywords comprises: determining a plurality of clusters in the first keywords; selecting first respective centroids for each of the plurality of clusters; grouping first respective data asset characteristics in the first keywords based on a first proximity to the first respective centroids; determining second respective centroids for each of the plurality of clusters; regrouping the first respective data asset characteristics in the first keywords based on a second proximity to the second respective centroids; and determining a difference in positions of the first respective centroids and the second respective centroids.
9. The method of any one of the preceding embodiments, wherein the first data asset type includes a data asset type schema that comprises metadata categories for the first data asset type.
10. The method of claim 2, wherein generating for display the plurality of options further comprises: retrieving a first template for creating the second data asset based on the first ontology derived from the knowledge graph; and selecting the plurality of options based on the first template.
11. The method of any one of the preceding embodiments, wherein retrieving the first template further comprises: filtering a plurality of available templates based on the first user action to identify the first template as corresponding to the first user action; and determining a plurality of data asset types based on the first template to display as the plurality of options.
12. A tangible, non-transitory, machine-readable medium storing instructions that, when executed by a data processing apparatus, cause the data processing apparatus to perform operations comprising those of any of embodiments 1-11.
13. A system comprising one or more processors; and memory storing instructions that, when executed by the processors, cause the processors to effectuate operations comprising those of any of embodiments 1-11.
14. A system comprising means for performing any of embodiments 1-11.

What is claimed is:

1. A system for creating a data asset generator based on a knowledge-graph-based recommendation engine to present templates based on previous data assets containing useful attributes when creating a data asset, the system comprising:
   one or more processors; and
   a non-transitory computer readable medium having instructions recorded thereon that when executed by the one or more processors cause operations comprising:
   detecting, by using a k-means clustering machine learning model, a first data asset characteristic cluster, wherein the first data asset characteristic cluster is based on keywords identified from a first data asset;
   detecting, by using the k-means clustering machine learning model, a second data asset characteristic cluster, wherein the second data asset characteristic cluster is based on the keywords identified from the first data asset;
   determining, by using a natural language processing model, a first data asset type based on the first data asset characteristic cluster;
   determining, by using the natural language processing model, a second data asset type based on the second data asset characteristic cluster;
   generating, by using a machine learning model that may consider previous data assets as input, a knowledge graph, wherein the knowledge graph comprises the first data asset type and the second data asset type determined by the machine learning model;
detecting, by using the machine learning model, a first ontology, wherein the first ontology is based on a first subsection of the knowledge graph;
detecting, by using the machine learning model, a second ontology, wherein the second ontology is based on a second subsection of the knowledge graph;
receiving a first user action to generate a second data asset, wherein the first user action comprises user entry of desired data asset types for the second data asset;
determining a first template, wherein the first ontology and the second ontology are represented as the first template for a user; and
in response to determining the first template, generating for display, in a user interface, a plurality of options indicating potential data asset types based on the first user action.

2. A method of creating a data asset generator based on a knowledge-graph-based recommendation engine to present templates based on previous data assets containing useful attributes when creating a data asset, the method comprising:
detecting a first data asset characteristic cluster, wherein the first data asset characteristic cluster is based on a first data asset;
detecting a second data asset characteristic cluster, wherein the second data asset characteristic cluster is based on the first data asset;
determining a first data asset type based on the first data asset characteristic cluster;
determining a second data asset type based on the second data asset characteristic cluster;
generating a knowledge graph, wherein the knowledge graph comprises the first data asset type and the second data asset type;
detecting a first ontology, wherein the first ontology is based on a first subsection of the knowledge graph;
detecting a second ontology, wherein the second ontology is based on a second subsection of the knowledge graph;
receiving a first user action to generate a second data asset;
determining a first template for a user;
in response to determining the first template, generating for display, in a user interface, a plurality of options indicating potential data asset types based on the first user action; and
receiving a second user action selecting one or more data asset types based on the plurality of options.

3. The method of claim 2, further comprising:
determining a first keyword from a plurality of attributes contained in the first data asset; and
assigning the first keyword as a first data asset characteristic of the first data asset type.

4. The method of claim 2, wherein detecting the first data asset characteristic cluster for the first data asset type further comprises:
retrieving a first dataset comprising first keywords for a first set of data assets with unknown data asset types;
clustering a portion of the first keywords into the first data asset characteristic cluster; and
inputting the first data asset characteristic cluster into a model to determine the knowledge graph.

5. The method of claim 4, wherein the model is trained by:
semantically indexing manually tagged content; and
automatically tagged content, wherein the automatically tagged content is based on concept matching, statistical patterns, or linguistic analysis.

6. The method of claim 4, wherein the model is trained to:
detect ontologies for data asset types including classes, subclasses, relationship types and categories;
conduct semantic enrichment using natural language processing to determine relevant nodes, edges, and labels in the knowledge graph; and
conduct semantic tagging, wherein the semantic tagging adds semantic metadata to previously generated data asset characteristics for the first data asset characteristic cluster and the second data asset characteristic cluster.

7. The method of claim 4, wherein clustering the portion of the first keywords into the first data asset characteristic cluster further comprises using a k-means clustering model to cluster data asset characteristics with equivalent relationships in the first data asset characteristic cluster.

8. The method of claim 7, wherein using the k-means clustering model to cluster data asset characteristics with equivalent relationships in the first keywords comprises:
determining a plurality of clusters in the first keywords;
selecting first respective centroids for each of the plurality of clusters;
grouping first respective data asset characteristics in the first keywords based on a first proximity to the first respective centroids;
determining second respective centroids for each of the plurality of clusters;
regrouping the first respective data asset characteristics in the first keywords based on a second proximity to the second respective centroids; and
determining a difference in positions of the first respective centroids and the second respective centroids.

9. The method of claim 2, wherein the first data asset type includes a data asset type schema that comprises metadata categories for the first data asset type.

10. The method of claim 2, wherein generating for display the plurality of options further comprises:
retrieving a first template for creating the second data asset based on the first ontology derived from the knowledge graph; and
selecting the plurality of options based on the first template.

11. The method of claim 10, wherein retrieving the first template further comprises:
filtering a plurality of available templates based on the first user action to identify the first template as corresponding to the first user action; and
determining a plurality of data asset types based on the first template to display as the plurality of options.

12. A non-transitory, computer-readable medium comprising instructions recorded thereon that when executed by one or more processors causes operations comprising:
detecting a first data asset characteristic cluster, wherein the first data asset characteristic cluster is based on a first data asset;
detecting a second data asset characteristic cluster, wherein the second data asset characteristic cluster is based on the first data asset;
determining a first data asset type based on the first data asset characteristic cluster;
determining a second data asset type based on the second data asset characteristic cluster;

generating a knowledge graph, wherein the knowledge graph comprises the first data asset type and the second data asset type;

detecting a first ontology, wherein the first ontology is based on a first subsection of the knowledge graph;

detecting a second ontology, wherein the second ontology is based on a second subsection of the knowledge graph;

receiving a first user action to generate a second data asset;

determining a first template for a user;

in response to determining the first template, generating for display, in a user interface, a plurality of options indicating potential data asset types based on the first user action; and receiving a second user action selecting one or more data asset types based on the plurality of options.

13. The non-transitory, computer-readable medium of claim 12, wherein the instructions further cause operations comprising:

determining a first keyword from a plurality of attributes contained in the first data asset; and assigning the first keyword as a first data asset characteristic of the first data asset type.

14. The non-transitory, computer-readable medium of claim 12, wherein detecting the first ontology for the first data asset type further comprises:

retrieving a first dataset comprising first keywords for a first set of data assets with unknown data asset types;

clustering a portion of the first keywords into the first data asset characteristic cluster; and inputting the first data asset characteristic cluster into a model to determine the knowledge graph.

15. The non-transitory, computer-readable medium of claim 14, wherein the model is trained by:

semantically indexing manually tagged content; and automatically tagged content, wherein the automatically tagged content is based on concept matching, statistical patterns, or linguistic analysis.

16. The non-transitory, computer-readable medium of claim 14, wherein the model is trained to:

detect ontologies for data asset types including classes, subclasses, relationship types and categories;

conduct semantic enrichment using natural language processing to determine relevant nodes, edges, and labels in the knowledge graph; and conduct semantic tagging, wherein the semantic tagging adds semantic metadata to previously generated data asset characteristics for the first data asset characteristic cluster and the second data asset characteristic cluster.

17. The non-transitory, computer-readable medium of claim 14, wherein clustering the portion of the first keywords into the first data asset characteristic cluster further comprises using a k-means clustering model to cluster data asset characteristics with equivalent relationships in the first data asset characteristic cluster.

18. The non-transitory, computer-readable medium of claim 17, wherein using the k-means clustering model to cluster data asset characteristics with equivalent relationships in the first keywords comprises:

determining a plurality of clusters in the first keywords;

selecting first respective centroids for each of the plurality of clusters;

grouping first respective data asset characteristics in the first keywords based on a first proximity to the first respective centroids;

determining second respective centroids for each of the plurality of clusters;

regrouping the first respective data asset characteristics in the first keywords based on a second proximity to the second respective centroids; and determining a difference in positions of the first respective centroids and the second respective centroids.

19. The non-transitory, computer-readable medium of claim 12, wherein generating for display the plurality of options further comprises:

retrieving a first template for creating the second data asset based on the first ontology derived from the knowledge graph; and selecting data asset types from the plurality of options based on the first template.

20. The non-transitory, computer-readable medium of claim 19, wherein retrieving the first template further comprises:

filtering a plurality of available templates based on the first user action to identify the first template as corresponding to the first user action; and determining a plurality of data asset types based on the first template to display as the plurality of options.

* * * * *